A. Wallach,
Watch-Chain Attachment,
Nº 24,362.  Patented June 7, 1859.
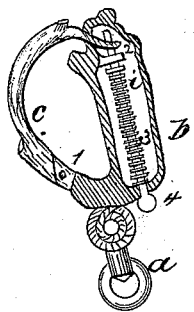
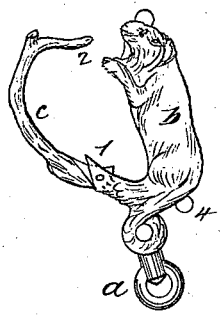
Witnesses
Lemuel W. Serrell
Thomas G. Harold
Inventor
Antony Wallach

UNITED STATES PATENT OFFICE.

ANTONY WALLACH, OF NEW YORK, N. Y., ASSIGNOR TO HIMSELF AND ADOLPH WALLACH, OF SAME PLACE.

HOOK FOR VEST-CHAINS.

Specification of Letters Patent No. 24,362, dated June 7, 1859.

*To all whom it may concern:*

Be it known that I, ANTONY WALLACH, of the city, county, and State of New York, have invented, made, and applied to use a certain new and useful Improvement in Hooks for Securing Watch or Guard Chains to the Vest-Buttonholes; and I do hereby declare that the following is a full, clear, and exact description of the construction and operation of the same, reference being had to the annexed drawing, making part of this specification, wherein—

Figure 1, is a view of said hook as open; and Fig. 2, is a section of the same when closed.

Similar marks of reference denote the same parts.

The hooks to vest chains heretofore in use, have usually been formed simply to hook into the buttonhole, but sometimes with a sliding ring to confine the end of said hook. In these instances the hook could be easily slipped out of the buttonhole, either accidentally or by robbers and the chain and watch stolen. The nature of my said invention consists in a clasping hook and bolting pin so fitted that there is no possibility of removing said hook so long as the parts remain perfect, without drawing back and unbolting the said clasping hook, thus giving great security, and at the same time making an ornamental and handsome end to the vest chain.

In the drawing $a$, is a swivel eye or other device for attaching the chain to the hook, $b$, is the body of said hook formed hollow and of a plain or ornamental shape, and $c$, is the clasping hook attached by the joint 1. The moving end of this clasping hook is formed with an eye 2, that enters an opening in the body $b$, and $i$, is a bolt within said body $b$, thrown forward by the spiral spring 3, and drawn back by the knob 4, by the party wearing the same, at the time that the end (2,) is entered within the body $b$, and the bolt $i$, being projected into the eye 2, retains the clasping hook firmly in place so that the same cannot be removed from the vest buttonhole without drawing the bolt $i$, back, except by breaking the parts.

What I claim as my invention and desire to secure by Letters Patent is—

The clasping hook $c$, in combination with the bolt $i$, in the body $b$, of the vest chain hook, for the purposes and as specified.

In witness whereof I have hereunto set my signature this fifteenth day of April 1859.

ANTONY WALLACH. [L. S.]

Witnesses:
LEMUEL W. SERRELL,
THOMAS G. HAROLD.